Aug. 19, 1958 K. STOLL 2,848,251
SPRING SUSPENSION FOR VEHICLES
Filed March 28, 1955
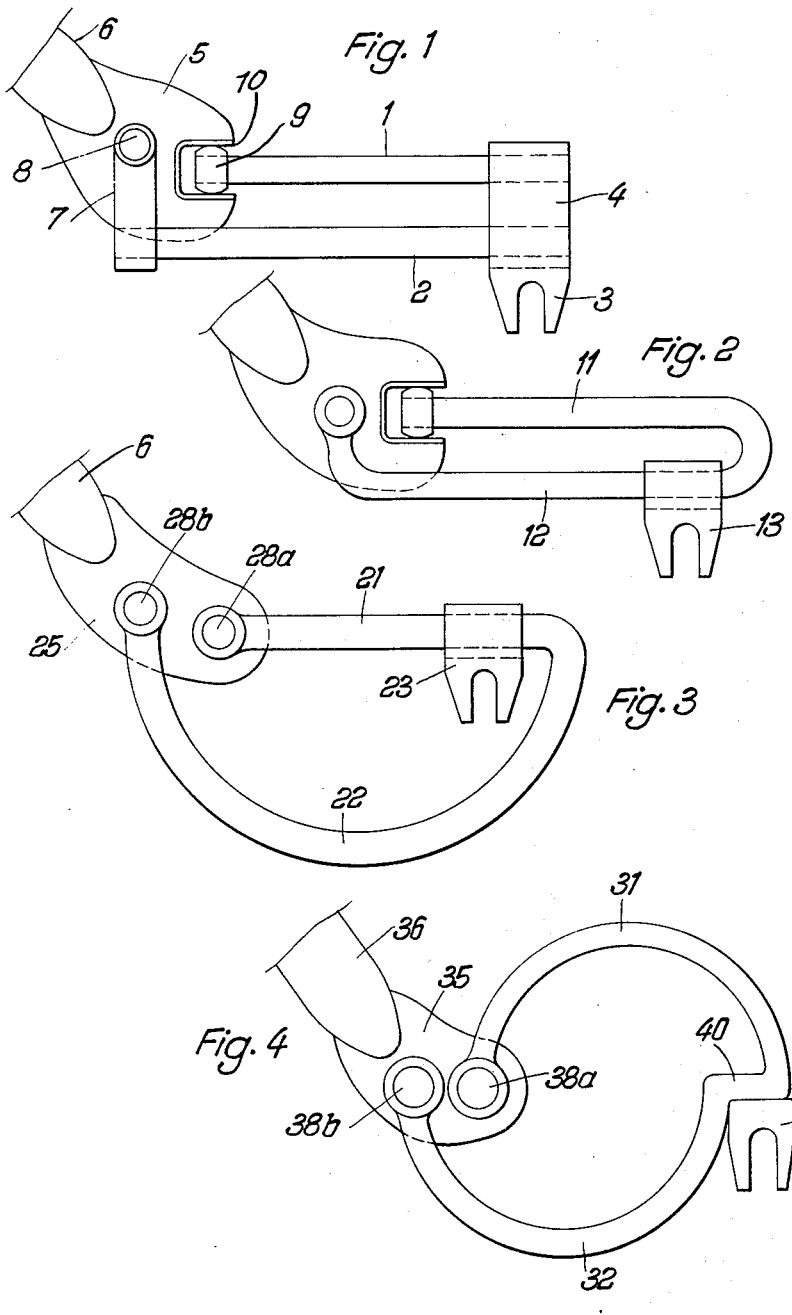
Inventor:
Karl Stoll
By his attorneys
Howson and Howson United States Patent Office 2,848,251
Patented Aug. 19, 1958

2,848,251

SPRING SUSPENSION FOR VEHICLES

Karl Stoll, Dusseldorf, Germany, assignor to Mannesmann Aktiengesellschaft, Dusseldorf, Germany, a corporation of Germany Application March 28, 1955, Serial No. 497,141

Claims priority, application Germany March 29, 1954

15 Claims. (Cl. 280—277)

The invention relates to a spring suspension for vehicles, and has for an object to provide a novel construction whereby economy of space of the suspension is achieved.

The basic feature of the invention consists in that an elongated load-carrying member forming a spring is secured to a wheel mounting in the region of the free end of a radius arm and extends substantially in the direction towards the anchor pin of the radius arm and is supported in the vicinity of the said pin, it being possible for the supporting means to be adjustable. With this arrangement, the extent of the bending of the spring is determined by the difference between the angular movement of the radius arm and the angular movement of the spring about an anchorage in the vicinity of the anchor pin of the radius arm. The degree of bending of the spring is smaller in proportion as the distance of the anchor pin from the supporting point of the spring is smaller. The spring may consequently be given a large cross-section and be of small length, and yet there may be produced a large angular movement of the radius arm, i. e. a large sprung travel of the wheel axis. The softness of the suspension may be adapted within wide limits to actual requirements by relative linear adjustment of the anchorages for the spring and the radius arm.

Various possible forms exist for carrying the invention into practice. In one particularly expedient constructional form, the radius arm is also a spring, so that the volume of the latter is available as a spring volume The suspension is given a particularly simple form if the spring and the resilient radius arm are formed by the two limbs of a single spring rod bent to form a loop.

If the two limbs of this spring loop extend rectilinearly and substantially parallel to one another, it is necessary for the supporting means for the end of one limb of the loop to be so designed that the ends of the loop are capable of a certain relative linear displacement in proportion to the flexure of the two limbs. This displacement is, however, avoided if at least one of the limbs of the spring loop is curved or cranked. In this latter case, both limbs may be non-displaceably connected to the supporting member by anchor pins, since the relative longitudinal displacement of the two limbs is taken up by the cranking or curvature.

The term "spring" in this specification is to be understood to include rods, bars, or plates of any convenient cross-section which are subjected to resilient deformation by bending.

The scope of the invention is defined in the appended claims, and four practical embodiments thereof, as applied by way of example to a cycle wheel suspension, will be particularly described with reference to the accompanying drawings in which:

Figure 1 is a first embodiment in which the radius arm is separate from the resilient load-carrying member; and Figures 2–4 show three alternative embodiments in which the radius arm is integral with the resilient load-carrying member.

Referring first to the construction shown in Figure 1, which illustrates a spring suspension of the front wheel of a bicycle or motor-cycle, it will be seen that two substantially parallel spring rods 1 and 2 are attached to the usual lug 3 for mounting on the wheel axle by means of a rigid element 4 integral with the lug and to which they are locked. The point of rigid interconnection of the radius arm with the resilient load carrying member is the rigid element 4. The opposite ends of the spring rods 1 and 2 engage an end bracket or spade 5 on one prong 6 of the usual steering fork, the lower spring rod 2 being pivotally connected to the spade 5 by means of an arm 7 anchored to the spade by a pivot pin 8 and secured at its other end to the spring rod. The upper spring rod 1 carries a rounded or barrelled pad 9 which engages in a slot 10 in the spade 5 so as to be both slidable and oscillatable therein within certain limits. As the spring rod assembly 1, 2 deflects under wheel loading, the rods are flexed about their spaced anchorages at points 8, 9, this flexure being in proportion to the difference of the angular movements of the two spring rods 1, 2.

In the arrangement shown in Figure 2, the spring 11 and the radius arm 12 are formed by the two limbs of a single spring rod bent substantially to hair-pin shape. The lower limb 12 of this spring rod carries the lug 13 for mounting the wheel axle. In other respects, the construction and operation of this suspension system correspond to those according to Figure 1.

In the arrangement shown in Figure 3, the one limb 21 of a D-shaped spring rod is straight and carries the lug 23 for mounting. This limb constitutes a radius arm. The second limb 22 has a generally semi-circular curvature, and constitutes a spring. The limbs are anchored by respective pivot pins 28a and 28b to the spade 25 of the fork prong 6. With oscillation of the wheel, both limbs 21, 22 are stressed as springs.

In the arrangement shown in Figure 4, both limbs 31 and 32 of a substantially circular spring loop are connected by respective pivot pins 38a and 38b to the spade 35 of the fork prong 6. The lug 33 for mounting the wheel axle is carried by a straight offset 40 connecting the arcuate limbs 31 and 32. Alternatively, the lug 33 may itself form the connecting element for two separate curved spring rods. Both limbs 31 and 32 function as combined springs and radius arms.

The linear spacing between the anchorage points 8, 9 (Figures 1 and 2) or 28a, 28b and 38a, 38b (Figures 3 and 4) may be adjustable to vary the rating of the suspension. In Figures 1 and 2, for example, the pads 9 may be adjustable axially on their respective spring rods 1, 11, whilst in Figures 3 and 4 either or both anchor pins 28a, 28b and 38a, 38b may have the portions which engage, respectively, the spade 25 or 35 and their associated spring rods or limbs 21, 22 or 31, 32 eccentrically arranged with respect to each other, so that by placing either pin in the spade 25 or 35 at a different angular position, their linear spacings can be varied.

In the constructions shown in Figures 1, 2 and 3 the limbs 2, 12 and 21, respectively, may be substantially inflexible so as to constitute simple radius arms. In Figure 4, either limb 31 or 32 may be substantially inflexible for this purpose.

The spring suspension may also be considered as having two rocking levers rigidly fixed together at their free ends, the axle of the vehicle being carried at those ends. The two levers have separated connections with closely adjacent pivotal axes on the vehicle and at least one of the levers is a flexible spring.

What I claim is:

1. In a wheel suspension for a vehicle, a wheel mounting, at least one radius arm and at least one resilient load-carrying member rigidly fixed to the wheel mounting at their deflecting ends and extending therefrom in the same general direction, and separate pivotal anchorages for the radius and resilient members at their other ends on the vehicle, said anchorages being spaced apart in the plane of deflection of the suspension; whereby a large sprung travel of the wheel mounting is obtained for a small bending of the resilient member.

2. In a wheel suspension for a vehicle, a radius member and an elongated resilient load-carrying member rigidly interconnected at their deflecting ends and extending in the same general direction between the wheel and the vehicle, a wheel mounting secured to one of the said interconnected members at its deflecting end, a pivotal anchorage at the other end of each said members for operatively connecting it to the vehicle, the said anchorages being spaced apart in the plane of deflection of the suspension by a distance dependent on the desired rating of the suspension.

3. A suspension system for a vehicle comprising a pair of substantially co-planar elongated members at least one of which is load carrying and resilient and at least one of which is a radius arm for defining the path of deflection of the wheel under load, a rigid interconnection between the said members, a wheel mounting secured to at least one of said members adjacent their point of interconnection, and separate pivotal anchorages for the members on the vehicle, said anchorages being spaced apart by a short distance in the common plane of the members.

4. A suspension system for a vehicle comprising a pair of substantially coplanar elongated members at least one of which is load-carrying and resilient and at least one of which is a radius arm for defining the path of deflection of the wheel under load, a rigid interconnection between the said members, a wheel mounting secured to at least one of said members adjacent their point of connection, and separate pivotal anchorages for the members on the vehicle, said anchorages being adjustably spaced apart by a short distance in the common plane of the members whereby a large sprung travel of the wheel mounting is obtained for a small bending of the resilient member and to permit variation of the suspension rating.

5. A suspension system for a vehicle comprising a wheel mounting, a radius arm secured to the wheel mounting, a pivotal anchorage for the radius arm on the vehicle, an elongated resilient load-carrying member rigidly connected to the radius arm adjacent its point of interconnection with the wheel mounting so as to lie coplanar with the radius arm, and a slidable anchorage on the vehicle for the other end of the resilient member, said slidable anchorage being close to the said pivotal anchorage for the radius arm but spaced therefrom in the plane of deflection of the suspension.

6. A suspension system for a vehicle comprising a bracket for rigid connection to the vehicle, a radius arm pivotally anchored at its one end to the bracket, a wheel mounting secured to the other end of the radius arm, an elongated resilient load-carrying member rigidly connected to the radius arm at the wheel mounting and lying coplanar with the radius arm, a slot in the bracket near the pivotal anchorage of the radius arm, and a bearing pad on the adjacent end of the said elongated member for slidable and pivotal engagement in the slot.

7. A suspension system for a vehicle comprising a bracket for rigid attachment to the vehicle, a resilient radius rod pivotally anchored at its one end to the bracket, a wheel mounting secured to the other end of the radius arm, an elongated resilient load-carrying member integral with the radius rod at the wheel mounting and lying co-planar with the radius arm, a slot in the bracket near the pivotal anchorage of the radius arm, and a bearing pad on the adjacent end of the said elongated member for slidable and pivotal engagement in the slot.

8. A suspension system for a vehicle comprising a radius arm, a wheel mounting secured to the radius arm, a pivotal connection between the radius arm and the vehicle, an elongated resilient load-carrying member rigid with relation to the radius arm adjacent the wheel mounting and lying co-planar with the said radius arm, and a pivotal connection between the said resilient member and the vehicle spaced a short distance from the radius arm pivotal connection in the common plane of the radius arm and the said member.

9. A suspension system for a vehicle comprising a bracket for rigid attachment to the vehicle, a radius arm pivotally anchored to the bracket, a wheel mounting on the radius arm remote from the pivot thereof, an elongated resilient load-carrying member integral with the radius arm adjacent the wheel mounting, and a pivotal anchorage for the said member on the bracket adjacent the radius arm pivot and spaced therefrom in the plane of the deflection of the suspension by a distance dependent on the desired rating of the suspension.

10. A cycle wheel suspension system comprising a wheel-carrying fork, a bracket at the end of a prong of the fork, a radius arm anchored to the bracket and extending parallel to the plane of the wheel, a wheel mounting on the radius arm remote from the bracket, a resilient load-carrying member rigid with the radius arm at a point adjacent the wheel mounting and lying in a plane parallel to the wheel and including the radius arm, and an anchorage for the said resilient member in the bracket spaced from the radius arm anchorage in the general direction of alignment of the bracket and the wheel mounting; whereby a large sprung travel of the system is obtained for a small bending of the resilient load-carrying member.

11. A cycle wheel suspension system comprising a wheel-carrying fork having a prong, a bracket at the end of the prong, a radius arm extending parallel to the plane of the wheel, a pivot pin anchoring same to the bracket and a wheel mounting on the radius arm remote from the bracket, in combination with a resilient load-carrying member rigid with relation to the radius arm at a point adjacent the wheel mounting and lying in a plane parallel to the wheel and including the radius arm, said arm and member both being of arcuate shape and concave toward each other, a pivot pin anchoring the member to the bracket, said member pivot pin being spaced from the radius arm anchorage in the general direction of alignment of the bracket and the wheel mounting, said radius arm constituting a second resilient load-carrying member.

12. A cycle wheel suspension system as claimed in claim 11 wherein at least one of the anchorages of the members to the bracket is adjustable towards and away from the other in the plane of deflection of the system.

13. A cycle wheel suspension system comprising a wheel-carrying fork, a bracket at the end of a prong of the fork, a radius arm anchored to the bracket and extending parallel to the plane of the wheel, a wheel mounting on the radius arm remote from the bracket, a resilient load-carrying member rigid with the radius arm at a point adjacent the wheel mounting and lying in a plane parallel to the wheel and including the radius arm, and an anchorage for the said resilient member in the bracket spaced from the radius arm anchorage in the general direction of alignment of the bracket and the wheel mounting; said radius arm constituting a second resilient load-carrying member.

14. A cycle wheel suspension system comprising a wheel-carrying fork, a bracket at the end of a prong of the fork, a radius arm anchored to the bracket and extending parallel to the plane of the wheel, a wheel mounting on the radius arm remote from the bracket, a resilient load-carrying member rigid with the radius arm at a point adjacent the wheel mounting and lying in a plane parallel to the wheel and including the radius arm, and an anchorage for the said resilient member in the bracket spaced from the radius arm anchorage in the general direction of alignment of the bracket and the wheel mounting, said radius arm constituting a second resilient load-carrying member, at least one of the load-carrying members being of arcuate shape.

15. A spring suspension for the axle of a vehicle, comprising two rocking levers rigidly fixed together at their free ends and carrying the axle of the vehicle at that point, the two levers having separated but closely adjacent pivotal axes on the vehicle, at least one of said levers being a flexible spring; whereby a large sprung travel of the axle is obtained for a small bending of the flexible spring lever.

References Cited in the file of this patent

UNITED STATES PATENTS

| | | |
|---|---|---|
| 359,863 | Harrington | Mar. 22, 1887 |
| 461,001 | Thompson | Oct. 13, 1891 |
| 908,993 | Huber | Jan. 5, 1909 |
| 2,166,880 | Schuh et al. | July 18, 1939 |
| 2,525,171 | Franks | Oct. 10, 1950 |
| 2,534,722 | Meiklejohn et al. | Dec. 19, 1950 |

FOREIGN PATENTS

| | | |
|---|---|---|
| 523,700 | Great Britain | July 19, 1940 |